(12) United States Patent
Knoener et al.

(10) Patent No.: US 11,958,142 B2
(45) Date of Patent: Apr. 16, 2024

(54) SYSTEMS AND METHODS TO CONTROL PULSE WELDING

(71) Applicant: Illinois Tool Works Inc., Glenview, IL (US)

(72) Inventors: Craig Steven Knoener, Appleton, WI (US); Lucas Charles Johnson, Appleton, WI (US); Zach W. MacMullen, Larsen, WI (US); Charles Ace Tyler, Neenah, WI (US); Christine Dong, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 723 days.

(21) Appl. No.: 16/653,488

(22) Filed: Oct. 15, 2019

(65) Prior Publication Data

US 2020/0122261 A1  Apr. 23, 2020

Related U.S. Application Data

(60) Provisional application No. 62/748,046, filed on Oct. 19, 2018.

(51) Int. Cl.
*B23K 9/09* (2006.01)
*B23K 9/095* (2006.01)
*B23K 9/10* (2006.01)

(52) U.S. Cl.
CPC ............ *B23K 9/092* (2013.01); *B23K 9/0953* (2013.01); *B23K 9/1006* (2013.01); *B23K 9/1062* (2013.01)

(58) Field of Classification Search
CPC .. B23K 9/0953; B23K 9/1006; B23K 9/1062; B23K 9/06; B23K 9/073; B23K 9/0731;
(Continued)

(56) References Cited

U.S. PATENT DOCUMENTS

| 6,909,067 B2* | 6/2005 | Davidson | B23K 9/091 219/130.21 |
| 8,704,131 B2* | 4/2014 | Davidson | B23K 9/092 219/130.51 |

(Continued)

FOREIGN PATENT DOCUMENTS

| CN | 105008079 | 10/2015 |
| CN | 105307808 | 2/2016 |

*Primary Examiner* — Tu B Hoang
*Assistant Examiner* — Bonita Khlok
(74) *Attorney, Agent, or Firm* — McAndrews, Held & Malloy, Ltd.

(57) ABSTRACT

Systems and methods to control pulse welding are disclosed. An example welding-type system includes: power conversion circuitry configured to convert input power to welding-type power; and control circuitry configured to control the power conversion circuitry to output the welding-type power in a plurality of pulse cycles, each pulse cycle comprising a background phase, a ramp up phase, a peak phase, and a ramp down phase. Controlling the power conversion circuitry involves: during the ramp up phase of the pulse cycles, controlling the power conversion circuitry in a current-controlled mode and switching to controlling the power conversion circuitry in a voltage-controlled mode when a peak transition voltage is reached; and during the ramp down phase of the pulse cycles, controlling the power conversion circuitry in a current-controlled mode and switching to controlling the power conversion circuitry in a voltage-controlled mode when a background transition voltage is reached.

16 Claims, 4 Drawing Sheets

(58) Field of Classification Search
CPC .. B23K 9/133; B23K 9/173; B23K 9/09–092;
B23K 9/095–0956
USPC .......... 219/130.51, 130.5, 130.01, 86.7, 110,
219/125.1, 130.31–130.33, 137 PS, 130.1
See application file for complete search history.

(56) References Cited

U.S. PATENT DOCUMENTS

| | | | |
|---|---|---|---|
| 2014/0175074 A1* | 6/2014 | Davidson | B23K 9/092 219/130.51 |
| 2016/0074954 A1* | 3/2016 | Marschke | B23K 9/0953 219/130.51 |
| 2016/0361773 A1 | 12/2016 | Knoener et al. | |
| 2017/0050255 A1* | 2/2017 | Davidson | B23K 9/091 |

* cited by examiner

FIG. 1

(Prior Art)

SYSTEMS AND METHODS TO CONTROL PULSE WELDING

RELATED APPLICATIONS

This patent claims priority to U.S. Provisional Patent Application Ser. No. 62/748,046, filed Oct. 19, 2018, entitled "Systems and Methods to Control Pulse Welding." The entirety of U.S. Provisional Patent Application Ser. No. 62/748,046 is incorporated herein by reference.

TECHNICAL FIELD

This disclosure relates generally to welding-type power supplies and, more particularly, to systems and methods to control pulse welding.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

One known welding process is a pulsed MIG process. A pulsed MIG process typically has a cyclical output having at least a peak phase with a relatively high current and a background phase with a relatively low current. There is often an abrupt change in slope from the beginning and end of the peak and background phases.

SUMMARY

The present disclosure is directed to systems and methods to control pulse welding, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not to scale. Where appropriate, the same or similar reference numerals are used in the figures to refer to similar or identical elements.

DETAILED DESCRIPTION

Disclosed example system and methods improve arc length regulation of the pulse welding transfer modes for gas metal arc welding (GMAW) compared to conventional pulse welding techniques. In some examples, disclosed systems and methods trigger transitions from ramp up phases and ramp down phases of pulse cycles to the peak phases and background phases based on respective transition voltages, instead of based on current as in conventional pulse welding systems. The example systems and methods are particularly effective in obtaining consistent pulse shaping with varying contact-tip-to-work-distances (CTWD).

Pulse welding, as used herein, includes welding with output power that is generally pulsed, at a controllable frequency, between a greater peak and a lesser background, and pulse welding is performed in an arc state. Occasional, inadvertent shorts may occur, but the process is generally in an arc state. Welding cycle (or pulse cycle), as used herein, is comprised of at least a peak, followed by a transition down, followed by a background, followed by a transition up. Welding cycles are typically on the order of milliseconds or tens of milliseconds. Welding cycles can include other phases as well, and a controller can use a state-based control scheme where, under certain circumstance, the typical order (peak, down, background, up) is not followed.

Examples of the present disclosure may be described herein below with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general-purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating. As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding-type systems include: power conversion circuitry configured to convert input power to welding-type power; and control circuitry configured to control the power conversion circuitry to output the welding-type power in a plurality of pulse cycles, each pulse cycle comprising a background phase, a ramp up phase, a peak phase, and a ramp down phase. Controlling the power conversion circuitry includes: during the ramp up phase of the pulse cycles, controlling the power conversion circuitry in a current-controlled mode and switching to controlling the power conversion circuitry in a voltage-controlled mode when a peak transition voltage is reached and, during the ramp down phase of the pulse cycles, controlling the power conversion circuitry in the current-controlled mode and switching to controlling the power conversion circuitry in the voltage-controlled mode when a background transition voltage is reached.

In some examples, the control circuitry is configured to: control the power conversion circuitry based on a peak voltage during the peak phase of the pulse cycles, and determine the peak transition voltage based on the peak voltage, wherein the peak transition voltage is lower than the peak voltage. In some examples, the control circuitry is configured to: control the power conversion circuitry based on a background voltage during the background phase of the pulse cycles, and determine the background transition voltage based on the background voltage, wherein the background transition voltage is higher than the background voltage.

In some example welding-type systems, the control circuitry is configured to control the power conversion circuitry in the voltage-controlled mode by controlling the power conversion circuitry based on comparing an output voltage of the power conversion circuitry to a target voltage. In some such examples, the control circuitry is configured to set the target voltage to be a peak voltage during the peak phases and set the target voltage to be a background voltage during the background phases. In some examples, the control circuitry is configured to control the power conversion circuitry in the current-controlled mode by controlling the power conversion circuitry based on comparing an output current of the power conversion circuitry to a target current. In some such examples, the control circuitry is configured to ramp up the target current during the ramp up phases and ramp down the target current during the ramp down phases.

In some examples, the control circuitry is configured to, during the ramp up phase: control the power conversion circuitry in the current-controlled mode by ramping up an output current of the power conversion circuitry from a background current; monitor an output voltage of the power conversion circuitry while the output current is increasing; and in response to detecting that the output voltage satisfies the peak transition voltage, control the power conversion circuitry to output the output current based on comparing the output voltage to the peak voltage. In some example welding-type systems, wherein the control circuitry is configured to, during the ramp down phase: control the power conversion circuitry in the current-controlled mode by ramping down an output current of the power conversion circuitry from a peak current; monitor an output voltage of the power conversion circuitry while the output current is decreasing; and in response to detecting that the output voltage satisfies the background transition voltage, control the power conversion circuitry to output the output current based on comparing the output voltage to the background voltage. In some examples, the control circuitry is configured to determining at least one of the peak transition voltage or the background transition voltage to cause wave shaping of the pulse cycle.

Disclosed example methods for pulse welding involve: controlling, via control circuitry, power conversion circuitry to output welding-type power in a plurality of pulse cycles, each pulse cycle comprising a background phase, a ramp up phase, a peak phase, and a ramp down phase. The controlling of the power conversion circuitry involves: during the ramp up phase of the pulse cycles, controlling, via the control circuitry, the power conversion circuitry in a current-controlled mode and switching to controlling the power conversion circuitry in a voltage-controlled mode when a peak transition voltage is reached; and during the ramp down phase of the pulse cycles, controlling, via the control circuitry, the power conversion circuitry in a current-controlled mode and switching to controlling the power conversion circuitry in a voltage-controlled mode when a background transition voltage is reached.

In some example methods, the controlling of the power conversion circuitry involves controlling the power conversion circuitry based on a peak voltage during the peak phase of the pulse cycles, and the methods further involve determining the peak transition voltage based on the peak voltage, wherein the peak transition voltage is lower than the peak voltage. In some examples, the controlling of the power conversion circuitry involves controlling the power conversion circuitry based on a background voltage during the background phase of the pulse cycles, and the example methods further involve determining the background transition voltage based on the background voltage, wherein the background transition voltage is higher than the background voltage.

In some examples, the controlling of the power conversion circuitry in the voltage-controlled mode involves controlling the power conversion circuitry based on comparing an output voltage of the power conversion circuitry to a target voltage. In some examples, the controlling of the power conversion circuitry involves setting the target voltage to be a peak voltage during the peak phases and set the target voltage to be a background voltage during the background phases.

In some examples, the controlling of the power conversion circuitry in the current-controlled mode involves controlling the power conversion circuitry based on comparing an output current of the power conversion circuitry to a target current. In some examples, the controlling of the power conversion circuitry ramping up the target current during the ramp up phases and ramping down the target current during the ramp down phases.

In some example methods, the controlling of the power conversion circuitry during the ramp up phase involves: controlling the power conversion circuitry in the current-controlled mode by ramping up an output current of the power conversion circuitry from a background current, monitoring an output voltage of the power conversion circuitry while the output current is increasing and, in response to detecting that the output voltage satisfies the peak transition voltage, controlling the power conversion circuitry to output the output current based on comparing the output voltage to the peak voltage. In some example methods, the controlling of the power conversion circuitry during the ramp down phase involves: controlling the power conversion circuitry in the current-controlled mode by ramping down an output current of the power conversion circuitry from a peak current, monitoring an output voltage of the power conversion circuitry while the output current is decreasing and, in response to detecting that the output voltage satisfies the background transition voltage, controlling the power conversion circuitry to output the output current based on comparing the output voltage to the background voltage.

Some example methods further involve determining at least one of the peak transition voltage or the background transition voltage to cause wave shaping of the pulse cycle.

Figure 1:
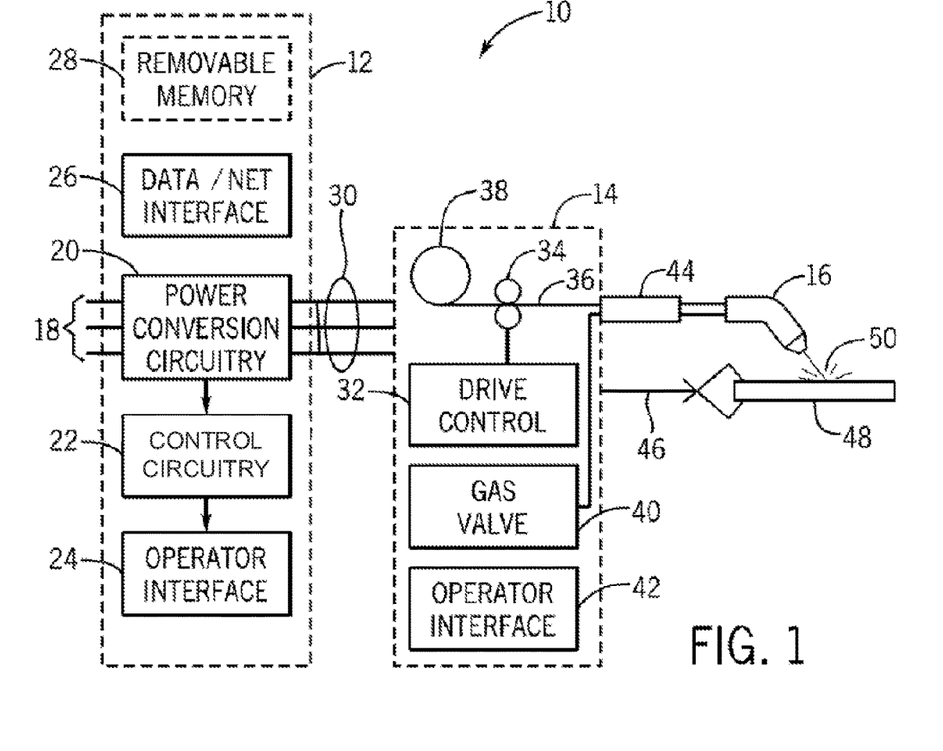
FIG. 1 is a diagram of an example welding-type system in accordance with aspects of this disclosure.

FIG. 1 is a diagram of an example welding-type system 10 in accordance with aspects of this disclosure. The example welding-type system 10 is a GMAW (gas metal arc welding) system, and in particular a MIG welding system. However, the example system 10 may perform flux cored arc welding (FCAW) and/or other wire-fed weld processes. In the example of FIG. 1, the system 10 includes a power supply 12 configured to receive and convert input power to welding-type power, which is output to a wire feeder 14. The wire feeder delivers the power to a welding torch 16 to perform a welding operation.

The power supply 12 receives input power 18 from any suitable source, such as the power grid, an engine-generator set, hybrid power supplies, fuel cells, batteries, and/or any combination of these input power sources and/or other power sources. Power conversion circuitry 20 converts the input power 18 to welding-type power. The power supply 12 may be designed to carry out multiple different welding processes that can be selected by an operator, and the power conversion circuitry 20 includes components, such as solid state switches discussed below, that allow for power conversion in accordance with the desired process. Control circuitry 22 is coupled to the power conversion circuitry 20 and controls the operation of the power conversion circuitry during the selected process. For example, the control circuitry 22 may provide signals that regulate the conductive states of solid state switches within the power conversion circuitry to produce the desired output power, as also discussed below. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control circuitry 22. The power supply 12 may further include communications circuitry that allows for communications with remote or networked components and systems, illustrated as data/network interface 26 in FIG. 1. Such communications circuitry may allow for monitoring of welding operations, logging of weld data, downloading or configuration of new processes and updates to processes, and so forth. Finally, the power supply 12 will sometimes include removable memory 28 that may be used for storing processes, process parameters, system updates, and any suitable data.

The example system 10 includes a wire feeder 14 which may be separate from and/or integrated into the power supply 12 (e.g., contained within a housing of the power supply 12). In the illustrated example, power and/or data may be transferred from the power supply 12 to the wire feeder 14 via one or more cables or cable bundles 30. The wire feeder 14 includes drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves 40 for providing shielding gas for a welding operation. Finally, an operator interface 42 may allow certain parameters of the wire feeder to be selected, such as wire feed speed. The power supply 12 and wire feeder 14 may operate in coordination so that wire and gas resources are fed to the welding operation when power is provided for welding at the initiative of the welding operator (e.g., via a control on the torch 16).

The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

The example power conversion circuitry 20 includes an input rectifier that converts AC power to DC power, a power factor correction boost circuit that receives the rectified input and provides a boosted bus to an isolated converter. The converter may be a dual two-switch interleaved forward converter, which may include an output rectifier and an output inductor. The wire feeder 14 feeds the wire at a rate set by the user, and the control circuitry 22 causes power conversion circuitry 20 to provide an output at the current necessary for that wire feed speed, and at the desired voltage.

Figure 2:
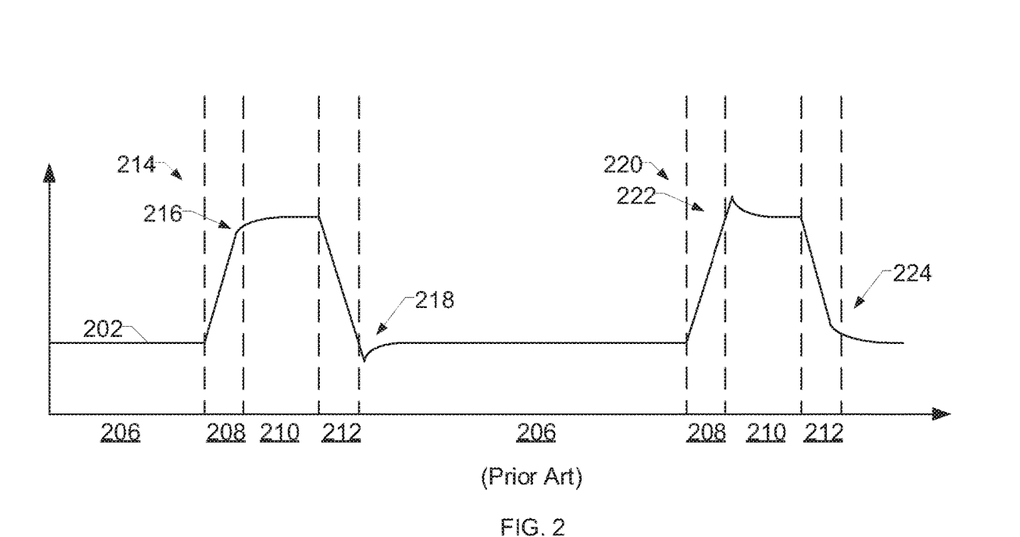
FIG. 2 illustrates example voltage and current waveforms output by conventional pulse welding processes, which may include undesirable voltage overshoot and/or undesirable voltage undershoot.

FIG. 2 illustrates an output current waveform 202 output by conventional pulse welding processes, which may include undesirable voltage overshoot and/or undesirable voltage undershoot. During conventional pulse welding processes, a weld controller controls the output current 202, which results in a weld voltage waveform. In the absence of short circuits, the weld voltage waveform follows the shape of the output current waveform 202. Conventional pulse welding processes include a succession of pulse cycles, in which each pulse cycle includes: a background phase 206, a ramp up (e.g., background-to-peak) phase 208, a peak phase 210, and ramp down (e.g., peak-to-background) phase 212. During the peak phase 210 and the background phase 206, the weld controller may be regulating either weld current or weld voltage. During the ramp up phase 208, in conventional pulse processes, the weld controller increases the current at a defined ramp rate (e.g., in units of amperes per millisecond (A/ms)). Conversely, during the ramp down phase 212, the weld controller decreases the current at a defined ramp rate (e.g., in units of A/ms).

During the ramp up phase 208, the weld controller increases the current at the ramp rate until the weld current reaches the current defining the peak phase 210. If the weld controller is regulating weld current during the peak phase 210, the predicted current waveform and resulting current waveform for these two states match, regardless of the user adjusting contact-tip-to-work distance (CTWD). However, if the weld controller is regulating weld voltage during the peak phase 210, the predicted current waveform and resulting current waveform rarely match, because the actual CTWD is often different from the CTWD predicted by the weld controller.

In a first pulse cycle 214 illustrated in FIG. 2, the weld system has a shorter CTWD than predicted by the weld controller. Due to the conventional pulse control techniques and the shorter CTWD, the transition 216 from ramp up phase 208 to the peak phase 210 occurs at the expected current, but not the expected voltage. During the peak phase 210, the weld control loop must increase current to get to the desired peak voltage, which requires additional time based on the output inductance (e.g., control loop execution rate) of the weld system. If the CTWD is reduced far enough, the control loop does not have sufficient time to make the actual voltage match the desired voltage before the ramp down phase 212 of the pulse cycle 214 begins.

Similarly, when the weld controller is regulating weld voltage during the background phase 206 and the CTWD is less than expected, the transition 218 from the ramp down phase 212 to the background phase 206 occurs at the expected current, but not at the expected voltage. As a result, during the background phase 206, the conventional weld controller must increase current to get to the desired background voltage, which requires additional time based on the output inductance of the weld system.

In a second pulse cycle 220, the weld system has a longer CTWD than predicted by the weld controller. Due to the conventional pulse control techniques and the longer CTWD, the transition 222 from ramp up phase 208 to the peak phase 210 occurs at the expected current, but not the expected voltage. During the peak phase 210, the weld control loop must decrease current to get to the desired peak voltage, which requires additional time based on the output inductance of the weld system. If the CTWD is increased far enough, the control loop does not have sufficient time to make the actual voltage match the desired voltage before the ramp down phase 212 of the pulse cycle 220 begins.

Similarly, when the weld controller is regulating weld voltage during the background phase 206 and the CTWD is more than expected, the transition 224 from the ramp down phase 212 to the background phase 206 occurs at the expected current, but not at the expected voltage. As a result, during the background phase 206, the conventional weld controller must decrease current to get to the desired background voltage, which requires additional time based on the output inductance of the weld system.

Figure 3:
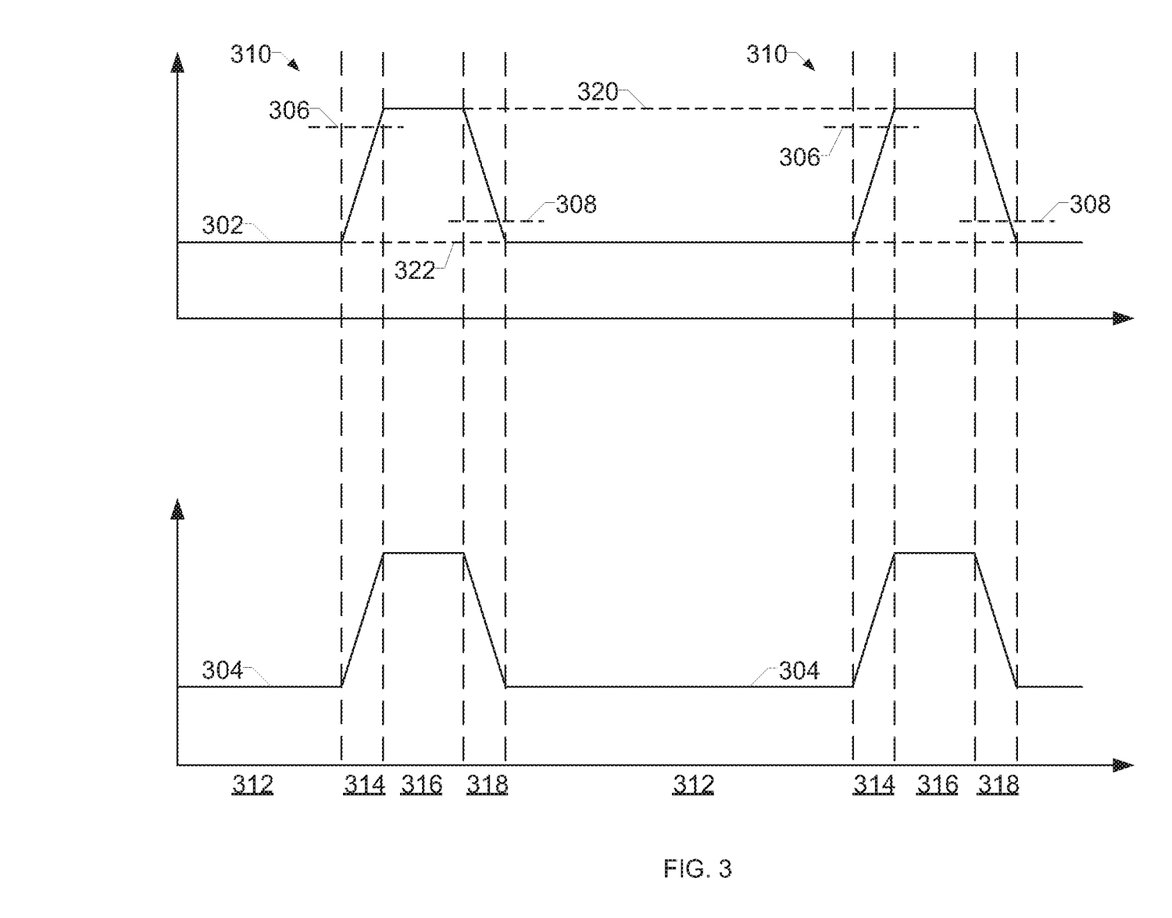
FIG. 3 illustrates example voltage and current waveforms, including peak transition voltages and background transition voltages, that may be output by the power conversion circuitry of FIG. 1 to perform a pulse welding process.

FIG. 3 illustrates an example voltage waveform 302 and an example current waveform 304 that may be output by the power conversion circuitry 20 of FIG. 1 to perform a pulse welding process. FIG. 3 further illustrates example peak transition voltage 306 and background transition voltages 308. The voltage waveform 302 and the current waveform 304 include example pulse cycles 310, each of which include a background phase 312, a ramp up phase 314, a peak phase 316, and a ramp down phase 318.

The example system 10 of FIG. 1 provides pulse control such that the actual weld current waveform and the desired weld current waveform closely match each other, even as the user adjusts the CTWD. The example control circuitry 22 of FIG. 1 controls the power conversion circuitry 20 to transition between phases of the pulse cycles 310 based on transition voltages, instead of based on current as in the conventional techniques discussed above.

During the ramp up phases 314 of the pulse cycles 310, the control circuitry 22 controls the power conversion circuitry 20 in a current-controlled mode, and switches to controlling the power conversion circuitry 20 in a voltage-controlled mode when the peak transition voltage 306 is reached. For example, the control circuitry 22 monitors the output voltage (e.g., the voltage waveform 302) of the power conversion circuitry 20 and compares the output voltage to the peak transition voltage 306 to determine when to transition to the peak phase 316 of the cycle 310. The output voltage may be measured at the power conversion circuitry 20, at the output terminals of the power supply 12, at the torch 16 across the arc, and/or at any other suitable location.

The control circuitry sets a target voltage (e.g., the voltage waveform 302) to be a peak voltage 320 during the peak phases 316 and/or sets the target voltage to be a background voltage 322 during the background phases 312.

During the ramp up phase 314, the control circuitry 22 may control the power conversion circuitry 20 in the current-controlled mode by ramping up an output current of the power conversion circuitry 20 from a background current. While ramping up the output current, the control circuitry 22 monitors an output voltage of the power conversion circuitry 20. At some time, the output voltage meets and exceeds the peak transition voltage 306. In response to detecting that the output voltage satisfies the peak transition voltage 306, the control circuitry 22 controls the power conversion circuitry 20 to output the output current in the voltage-controlled mode (e.g., based on comparing the output voltage to the peak voltage 320).

Similarly, during the ramp down phase 318 of the pulse cycles 310, the control circuitry 22 controls the power conversion circuitry 20 in a current-controlled mode, and switches to controlling the power conversion circuitry 20 in a voltage-controlled mode when the background transition voltage is reached 308. For example, during the ramp down phase 318, the control circuitry 22 may control the power conversion circuitry 20 in the current-controlled mode by ramping down an output current of the power conversion circuitry 20 from a peak current. While ramping down the current, the control circuitry 22 monitors an output voltage of the power conversion circuitry 20. In response to detecting that the output voltage satisfies the background transition voltage 308, the control circuitry 22 controls the power conversion circuitry 20 to output the output current based on comparing the output voltage to a background voltage 322.

In voltage-controlled mode, the control circuitry 22 controls the power conversion circuitry 20 based on comparing an output voltage (e.g., the voltage waveform 302) of the power conversion circuitry 20 to a target voltage. The control circuitry 22 may change the target voltage based on the present phase of the pulse cycle 310. For example, during the peak phase 316, the target voltage may be a peak voltage 320. Similarly, during the background phase 312, the target voltage may be a background voltage. In current-controlled mode, the control circuitry 22 controls the power conversion circuitry 20 based on comparing an output current of the power conversion circuitry to a target current. For example, during the ramp-up phases 314 and the ramp down phases 318, the control circuitry 22 may increase or decrease the current over the duration of the ramp up phase 314 or the ramp down phase 318.

The control circuitry 22 may determine the peak transition voltage 306 to be less than the peak voltage 320 based on, for example, an offset voltage from the peak voltage 320. The control circuitry 22 may determine the background transition voltage 308 to be greater than the background voltage based on, for example, an offset voltage from the background voltage.

In some examples, the control circuitry 22 may increase and/or decrease the peak transition voltage 306 and/or the background transition voltage 308 to achieve desired welding effects. For example, lowering the peak transition voltage 306 relative to the peak voltage 320 may cause ramp up phase 314 to terminate earlier and add a curve at the transition to the peak phase 316. Conversely, raising the peak transition voltage 306 relative to the peak voltage 320 may cause the ramp up phase 314 to terminate late and add an overshoot at the transition to the peak phase 316. In a similar manner, the control circuitry 22 may also increase or decrease the background transition voltage 308 relative to the background voltage 322 to achieve curving or overshoot, respectively. Thus, the example control circuitry 22 may adjust the peak transition voltage 306 and/or the background transition voltage 308 to achieve wave shaping, such as to obtain a desired waveform (e.g., match a legacy waveform expected for a particular weld process).

Figure 4:
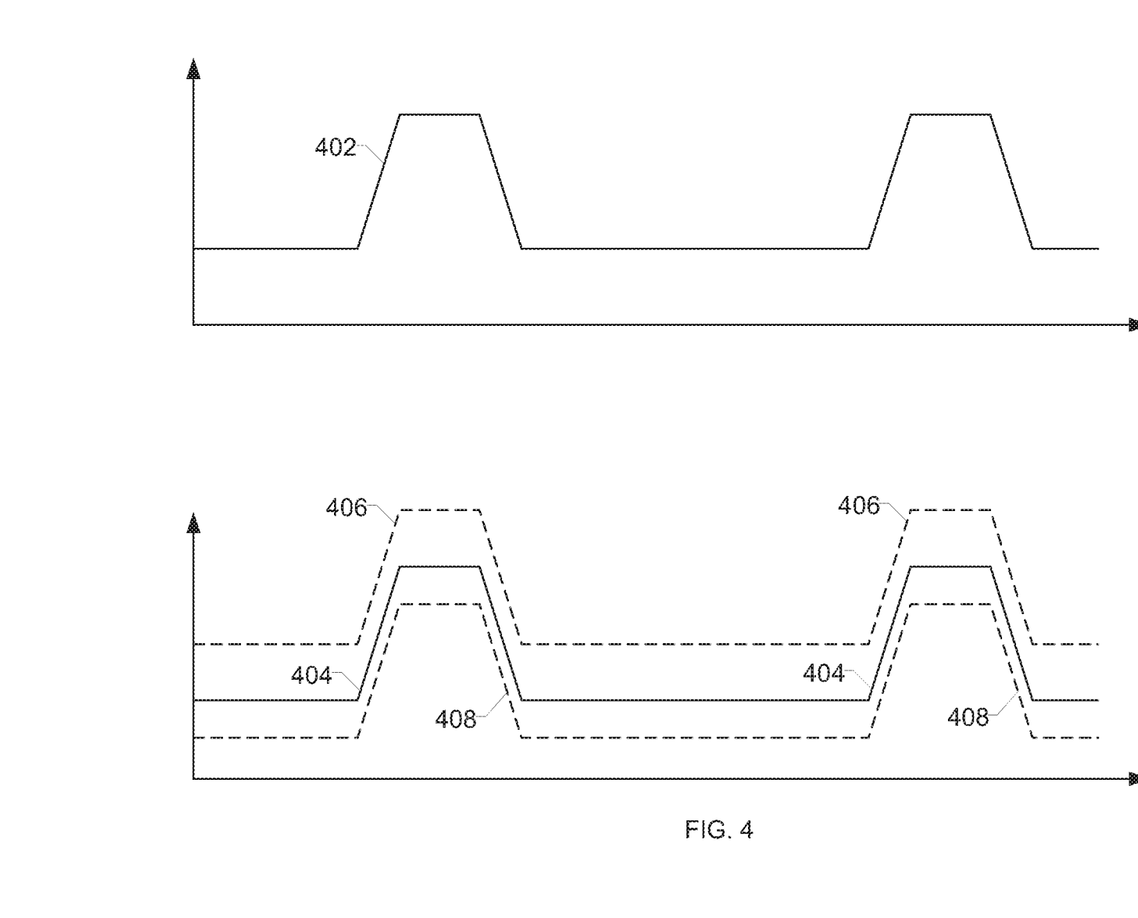
FIG. 4 illustrates example voltage and current waveforms that may be output by the power conversion circuitry of FIG. 1 in response to multiple contact-tip-to-work distances.

The example system 10 provides a resulting voltage waveform that has the same shape as the predicted or nominal voltage waveform. Thus, disclosed example systems and methods provide consistent arc transfer as the user adjusts the CTWD. FIG. 4 illustrates example an example voltage waveform 402 and example current waveforms 404-408 that may be output by the power conversion circuitry 20 of FIG. 1 in response to multiple contact-tip-to-work distances. The example voltage waveform 402 remains substantially constant regardless of changes in CTWD. The example current waveform 404 illustrates the current during pulses in which the CTWD is an expected or nominal CTWD. The example current waveform 406 has a positive current offset relative to the current waveform 404, and occurs when the CTWD is less than the nominal or expected CTWD. Conversely, the example current waveform 408 has a negative current offset relative to the current waveform 404, and occurs when the CTWD is greater than the nominal or expected CTWD. Each of the current waveforms 404-408 has a shape that is consistent, and does not have the undershoots or overshoots associated with conventional pulse welding techniques. As the user adjusts CTWD, the resulting current waveform 404-408 adds or subtracts a current offset and/or gain, which maintains the voltage waveform 402.

Figure 5:
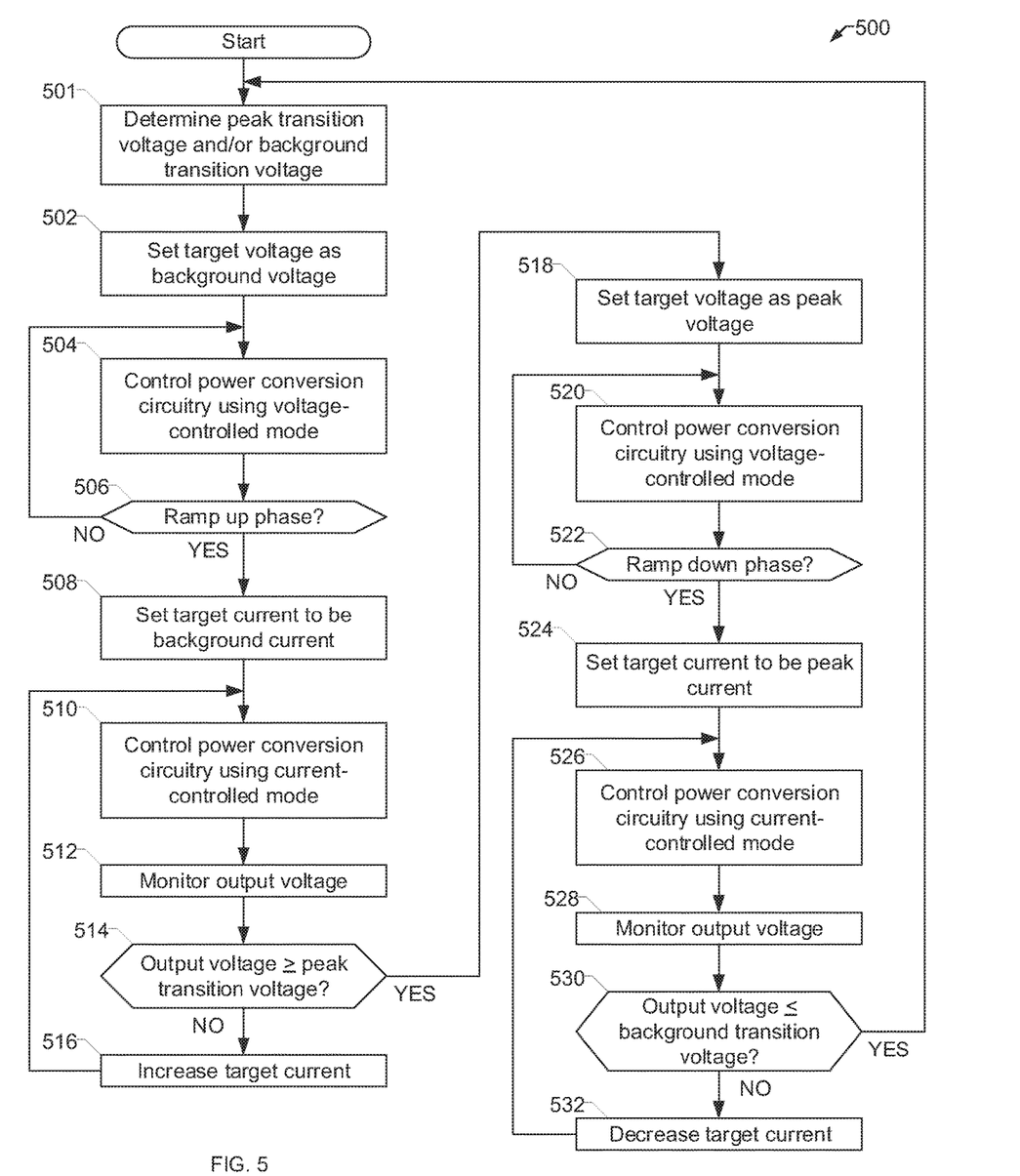
FIG. 5 is a flow chart representative of example machine readable instructions which may be executed to implement the welding-type power supply of FIG. 1 to control a pulse welding process.

FIG. 5 is a flow chart representative of example machine readable instructions 500 which may be executed to implement the welding-type power supply 12 of FIG. 1 to control a pulse welding process. The example instructions 500 may be performed to implement a steady state phase of a pulse welding process (e.g., following an arc starting routine and/or prior to an arc termination routine).

At block 501, the control circuitry 22 determines a peak transition voltage and/or a background transition voltage. For example, the control circuitry 22 may determine a peak transition voltage using an offset from a target peak voltage (e.g., an offset below the peak voltage) and/or a determine the background transition voltage using an offset from a target background voltage (e.g., an offset above the background voltage). In some examples, the peak transition voltage and/or the background transition voltage are selected to cause the output waveform to closely match the target (e.g., intended, ideal, and/or optimized) waveform. Additionally or alternatively, the peak transition voltage and/or the background transition voltage may be selected to induce overshoot and/or curving into the waveform relative to the target waveform.

At block 502, the control circuitry 22 sets a target voltage (e.g., for a voltage-controlled control loop) as a background voltage. For example, the control circuitry 22 may set the target voltage as the background voltage 322, which may be based on the parameters for the weld process (e.g., setpoint voltage, workpiece thickness, etc.). At block 504, the control circuitry 22 controls the power conversion circuitry using a voltage-controlled mode. In the voltage-controlled mode, the control circuitry 22 controls the power conversion circuitry 20 based on comparing an output voltage of the power conversion circuitry 20 to the target voltage.

At block 506, the control circuitry 22 determines whether a ramp up phase is to begin. For example, the background phase 312 may occur for a predetermined time, at which time the ramp up phase 314 begins. If the ramp up phase 314 is not to begin yet (block 506), control returns to block 504 to continue controlling the power conversion circuitry 20 in the background phase 312.

When the ramp up phase 314 begins (block 506), at block 508 the control circuitry 22 sets a target current to be the background current. At block 510, the control circuitry 22 controls the power conversion circuitry 20 using a current-controlled mode. In the current-controlled mode, the control circuitry 22 controls the power conversion circuitry 20 based on comparing an output current of the power conversion circuitry 20 to the target current. At block 512, the control circuitry 22 monitors an output voltage of the power conversion circuitry. For example, the control circuitry 22 may receive voltage feedback measured at any of the power conversion circuitry 20, the output terminals of the power supply 12, across the arc at the welding torch 16, and/or any other suitable location.

At block 514, the control circuitry 22 determines whether an output voltage is at least a peak transition voltage (e.g., the peak transition voltage 306). The peak transition voltage 306 may be determined based on peak voltage 320, the background voltage 322, and/or the weld parameters. If the output voltage is less than the peak transition voltage 306 (block 514), at block 516 the control circuitry 22 increases the target current and returns control to block 510 to continue ramping up the current.

When the output voltage is at least the peak transition voltage (block 514), at block 518 the control circuitry 22 sets the target voltage as a peak voltage (e.g., the peak voltage 320). At block 520, the control circuitry 22 controls the power conversion circuitry using the voltage-controlled mode.

At block 522, the control circuitry 22 determines whether a ramp down phase is to begin. For example, the peak phase 316 may occur for a predetermined time, at which time the ramp down phase 318 begins. If the ramp down phase 318 is not to begin yet (block 522), control returns to block 520 to continue controlling the power conversion circuitry 20 in the peak phase 316.

When the ramp down phase 318 begins (block 522), at block 524 the control circuitry 22 sets a target current to be the peak current. At block 526, the control circuitry 22 controls the power conversion circuitry 20 using a current-controlled mode. At block 528, the control circuitry 22 monitors the output voltage of the power conversion circuitry 20.

At block 530, the control circuitry 22 determines whether an output voltage is equal to or less than a background transition voltage (e.g., the background transition voltage 308). The background transition voltage 308 may be determined based on the peak voltage 320, the background voltage 322, and/or the weld parameters. If the output voltage is greater than the background transition voltage 308 (block 530), at block 532 the control circuitry 22 decreases the target current and returns control to block 526 to continue ramping down the current.

When the output voltage is less than or equal to the background transition voltage (block 530), control returns to block 501 to determine and/or change the peak transition voltage and/or the background transition voltage. In some other examples, control may return to block 502 to return to the background phase 312 and continue the pulse welding process, without changing the peak transition voltage or the background transition voltage.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
   power conversion circuitry configured to convert input power to welding-type power; and
   control circuitry configured to control the power conversion circuitry to output the welding-type power in a plurality of pulse cycles, each pulse cycle comprising a background phase, a ramp up phase, a peak phase, and a ramp down phase, wherein the controlling the power conversion circuitry comprises:
   during the ramp up phase of the pulse cycles, controlling the power conversion circuitry in a current-controlled mode based on comparing an output current of the power conversion circuitry to a target current while ramping up the target current;
   in response to reaching a peak transition voltage, switching to controlling the power conversion circuitry during the peak phase in a voltage-controlled mode based on a peak voltage;
   during the ramp down phase of the pulse cycles, controlling the power conversion circuitry in the current-controlled mode based on comparing the output current of the power conversion circuitry to the target current while ramping down the target current; and
   in response to reaching a background transition voltage, switching to controlling the power conversion circuitry during the background phase in the voltage-controlled mode,
   wherein the control circuitry is configured to determine the peak transition voltage as an offset to the peak voltage, wherein the peak transition voltage is lower than the peak voltage.

2. The welding-type system as defined in claim 1, wherein the control circuitry is configured to:
   control the power conversion circuitry based on a background voltage during the background phase of the pulse cycles, and
   determine the background transition voltage based on the background voltage, wherein the background transition voltage is higher than the background voltage.

3. The welding-type system as defined in claim 1, wherein the control circuitry is configured to control the power conversion circuitry in the voltage-controlled mode by controlling the power conversion circuitry based on comparing an output voltage of the power conversion circuitry to a target voltage.

4. The welding-type system as defined in claim 3, wherein the control circuitry is configured to set the target voltage to be a peak voltage during the peak phases and set the target voltage to be a background voltage during the background phases.

5. The welding-type system as defined in claim 1, wherein the control circuitry is configured to, during the ramp up phase:
control the power conversion circuitry in the current-controlled mode by ramping up an output current of the power conversion circuitry from a background current;
monitor an output voltage of the power conversion circuitry while the output current is increasing; and
in response to detecting that the output voltage satisfies the peak transition voltage, control the power conversion circuitry to output the output current based on comparing the output voltage to the peak voltage.

6. The welding-type system as defined in claim 1, wherein the control circuitry is configured to, during the ramp down phase:
control the power conversion circuitry in the current-controlled mode by ramping down an output current of the power conversion circuitry from a peak current;
monitor an output voltage of the power conversion circuitry while the output current is decreasing; and
in response to detecting that the output voltage satisfies the background transition voltage, control the power conversion circuitry to output the output current based on comparing the output voltage to the background voltage.

7. The welding-type system as defined in claim 1, wherein the control circuitry is configured to determining at least one of the peak transition voltage or the background transition voltage to cause wave shaping of the pulse cycle.

8. A method for pulse welding, the method comprising:
controlling, via control circuitry, power conversion circuitry to output welding-type power in a plurality of pulse cycles, each pulse cycle comprising a background phase, a ramp up phase, a peak phase, and a ramp down phase, wherein the controlling the power conversion circuitry comprises:
determining a peak transition voltage as an offset to a peak voltage, wherein the peak transition voltage is lower than the peak voltage;
during the ramp up phase of the pulse cycles, controlling, via the control circuitry, the power conversion circuitry in a current-controlled mode based on comparing an output current of the power conversion circuitry to a target current while ramping up the target current;
in response to reaching the peak transition voltage, switching to controlling the power conversion circuitry during the peak phase in a voltage-controlled mode based on the peak voltage;
during the ramp down phase of the pulse cycles, controlling, via the control circuitry, the power conversion circuitry in the current-controlled mode based on comparing the output current of the power conversion circuitry to the target current while ramping down the target current; and
in response to reaching a background transition voltage, switching to controlling the power conversion circuitry during the background phase in the voltage-controlled mode.

9. The method as defined in claim 8, wherein the controlling the power conversion circuitry comprises controlling the power conversion circuitry based on a background voltage during the background phase of the pulse cycles, the method further comprising determining the background transition voltage based on the background voltage, wherein the background transition voltage is higher than the background voltage.

10. The method as defined in claim 8, wherein the controlling the power conversion circuitry in the voltage-controlled mode comprises controlling the power conversion circuitry based on comparing an output voltage of the power conversion circuitry to a target voltage.

11. The method as defined in claim 10, wherein the controlling the power conversion circuitry comprises setting the target voltage to be a peak voltage during the peak phases and set the target voltage to be a background voltage during the background phases.

12. The method as defined in claim 8, wherein the controlling the power conversion circuitry during the ramp up phase comprises:
controlling the power conversion circuitry in the current-controlled mode by ramping up an output current of the power conversion circuitry from a background current;
monitoring an output voltage of the power conversion circuitry while the output current is increasing; and
in response to detecting that the output voltage satisfies the peak transition voltage, controlling the power conversion circuitry to output the output current based on comparing the output voltage to the peak voltage.

13. The method as defined in claim 8, wherein the controlling the power conversion circuitry during the ramp down phase comprises:
controlling the power conversion circuitry in the current-controlled mode by ramping down an output current of the power conversion circuitry from a peak current;
monitoring an output voltage of the power conversion circuitry while the output current is decreasing; and
in response to detecting that the output voltage satisfies the background transition voltage, controlling the power conversion circuitry to output the output current based on comparing the output voltage to the background voltage.

14. The method as defined in claim 8, further comprising determining at least one of the peak transition voltage or the background transition voltage to cause wave shaping of the pulse cycle.

15. The welding-type system as defined in claim 1, wherein the control circuitry is configured to control the power conversion circuitry to increase or decrease the output current while maintaining a substantially constant output voltage waveform for the plurality of pulse cycles over a range of contact-tip-to-work distances.

16. The method as defined in claim 8, further comprising increasing or decreasing the output current while maintaining a substantially constant output voltage waveform for the plurality of pulse cycles over a range of contact-tip-to-work distances.

* * * * *